United States Patent
Li et al.

(10) Patent No.: US 12,326,533 B2
(45) Date of Patent: Jun. 10, 2025

(54) METHOD AND APPARATUS FOR REMOVING TUBE WAVE INTERFERENCE FROM OPTICAL FIBER ACOUSTIC WAVE SENSING SEISMIC DATA

(71) Applicants: China National Petroleum Corporation, Beijing (CN); BGP Inc., China National Petroleum Corporation, Hebei (CN)

(72) Inventors: Yanpeng Li, Beijing (CN); Fei Li, Beijing (CN)

(73) Assignees: China National Petroleum Corporation, Beijing (CN); BGP Inc., China National Petroleum Corporation, Hebei (CN)

( * ) Notice: Subject to any disclaimer, the term of this patent is extended or adjusted under 35 U.S.C. 154(b) by 417 days.

(21) Appl. No.: 17/797,708

(22) PCT Filed: Jan. 28, 2021

(86) PCT No.: PCT/CN2021/074067
§ 371 (c)(1),
(2) Date: Aug. 4, 2022

(87) PCT Pub. No.: WO2021/155754
PCT Pub. Date: Aug. 12, 2021

(65) Prior Publication Data
US 2023/0072038 A1 Mar. 9, 2023

(30) Foreign Application Priority Data
Feb. 5, 2020 (CN) .......................... 202010080534.5

(51) Int. Cl.
*G01V 1/48* (2006.01)
*G01V 1/18* (2006.01)

(52) U.S. Cl.
CPC .................. *G01V 1/48* (2013.01); *G01V 1/18* (2013.01)

(58) Field of Classification Search
None
See application file for complete search history.

(56) References Cited

U.S. PATENT DOCUMENTS

| 4,715,019 A | 12/1987 | Medlin et al. |
| 5,168,470 A | 12/1992 | Dennis et al. |

(Continued)

FOREIGN PATENT DOCUMENTS

| CA | 3042987 A1 | 6/2018 |
| CN | 1447132 A | 10/2003 |

(Continued)

OTHER PUBLICATIONS

Anonymos., "Time-Frequency Analysis Method and Its Application in Seismic Data Processing, China Doctoral Dissertations Full-Text", pp. 109. CN First office action dated Dec. 12, 2021 in Application No. CN202010080534.5 with English translation.

(Continued)

*Primary Examiner* — Raymond L Nimox
(74) *Attorney, Agent, or Firm* — Weaver Austin Villeneuve & Sampson LLP (57) ABSTRACT

A method for removing tube wave interference from optical fiber acoustic wave sensing seismic data, including: acquiring seismic wavefield data which contains a tube wave and is collected by an optical fiber acoustic wave sensing instrument; calculating a root-mean-square amplitude of the waveform data cut on the seismic trace as an amplitude normalization factor; performing normalization processing on the amplitude value; performing de-tail mean filtering processing on the normalized amplitude value along the travel time of the tube wave, to obtain a predicted amplitude value; performing tube wave interference removal processing on each seismic trace, and performing inverse normal- (Continued)

ization processing to obtain the seismic wavefield data without tube wave interference. The method effectively suppresses the tube wave interference in the optical fiber acoustic wave sensing seismic data. An apparatus for removing tube wave interference from optical fiber acoustic wave sensing seismic data, and a computer device are further provided.

9 Claims, 3 Drawing Sheets

(56) References Cited

U.S. PATENT DOCUMENTS

| | | | |
|---|---|---|---|
| 6,332,507 | B1 | 12/2001 | Naville et al. |
| 6,724,319 | B1 | 4/2004 | Knaack et al. |
| 2003/0086335 | A1 | 5/2003 | Naville et al. |
| 2004/0172197 | A1 | 9/2004 | Fehmers et al. |
| 2021/0199832 | A1* | 7/2021 | Wu ..................... E21B 47/135 |

FOREIGN PATENT DOCUMENTS

| | | | |
|---|---|---|---|
| CN | 102692650 | A | 9/2012 |
| CN | 102778692 | A | 11/2012 |
| CN | 103782198 | A | 5/2014 |
| CN | 104133247 | A | 11/2014 |
| CN | 104216008 | A | 12/2014 |
| CN | 106154321 | A | 11/2016 |
| CN | 107526107 | A * | 12/2017 |
| CN | 108693561 | A | 10/2018 |
| CN | 109557587 | A | 4/2019 |
| GB | 201112154 | | 8/2011 |

OTHER PUBLICATIONS

CN Office Action dated Jun. 20, 2022 in Application No. CN202010080534.5 with English translation.
International search report dated Apr. 25, 2021 in Application No. PCT/CN2021/074067.
Li. Y, et al., "Application of Large Array 3D-VSP Technology in Daqing Oilfield", Petroleum Geophysical Exploration, 2011, vol. 46 No. 2, pp. 7.
Lindsey. N.J, et al., Fiber-optic network observations of earthquake wavefields: Fiber-optic earthquake observations, Geophysical Research Letters, 2017, pp. 22.
Ma. G, et al., "Numerical Simulation Method for Seismic Signal Detection in Distributed Acoustic Sensing Wells", Petroleum Geophysical Exploration, vol. 55 No. 2, pp. 11.
Sun. J, et al., "Comprehensive application of geophysical data", 202220010930, pp. 3.
Wang. S, et al., "Research on Cross-well Seismic and Joint Reservoir Prediction in Jiangqiao Areas in North Songliao Basin, Medicine & Public Health, China Doctoral Dissertations Full-Text Database, Basic Sciences", Aug. 15, 2008, vol. 8, pp. 20.
Zhagn. Q, et al., "Noise analysis and suppression method of fracturing microseismic field data," Inner Mongolia Petrochemical, 2016, pp. 4.
Zhao. B, et al., "Yesterday, Today and Tomorrow of Downhole Seismic Technology: Development and Application Prospects of Downhole Seismic Technology", Petroleum Geophysical Exploration, 2017, vol. 52 No. 5. pp. 14.
Zhou. R, et al., "Development Status and Prospect of Optical Fiber Seismic Wave Detection Technology," Geophysical Exploration, 2020, pp. 3.
Zou. G, et al., "Dictionary of Energy", Jan. 31, 1997, pp. 3.
Ashry I. et al., "Normalized Differential Method for Improving the Signal-to-noise Ratio of a Distributed Acoustic Sensor," Applied Optics, Jun. 20, 2019, vol. 58(18), pp. 4933-4938.
EP Extended European Search Report dated Jul. 14, 2023, in Application No. 21749991.2.

* cited by examiner

METHOD AND APPARATUS FOR REMOVING TUBE WAVE INTERFERENCE FROM OPTICAL FIBER ACOUSTIC WAVE SENSING SEISMIC DATA

CROSS-REFERENCE TO RELATED APPLICATIONS

This application is a National Stage of International Application No. PCT/CN2021/074067, filed Jan. 28, 2021, which claims priority to Chinese Patent Application No. 202010080534.5, filed Feb. 5, 2020, both of which are hereby incorporated by reference in their entireties.

FIELD

The present disclosure relates to the field of geophysical explorations, and particularly to a method and an apparatus for removing tube wave interference from optical fiber acoustic wave sensing seismic data.

BACKGROUND

With the rapid development, the optical fiber acoustic wave sensing technology is increasingly widely applied in borehole seismic explorations. Compared with the conventional geophone acquisition, the optical fiber acoustic wave sensing technology has the characteristics such as high-density sampling and high-temperature and high-pressure resistance. The optical fiber acoustic wave sensing technology mainly utilizes Rayleigh backscattering generated by laser light propagating in optical fibers. When the medium around the optical fibers vibrates, the Rayleigh backscattering will change correspondingly. Through a continuous observation and demodulation of such optical signal, seismic wave information of a stratum can be obtained.

Optical fiber acoustic wave sensing is suitable for observing seismic waves in a well. When the optical fibers are suspended in the well, tube wave interference is generated abnormally because of an incomplete coupling between the optical fibers and the borehole wall of the well, and a change in a distance between the optical fibers and the borehole wall causes tube wave energy to vary greatly, which seriously affects the receiving effect of the seismic waves. It is difficult to effectively remove the tube wave interference in the application of the optical fiber acoustic wave sensing technology in the seismic exploration.

The prior art mainly adopts two methods to remove tube wave interference from optical fiber acoustic wave sensing seismic data. One method is a median filtering method including: picking up a relatively accurate first arrival of a tube wave, and performing median filtering based on the first arrival of the tube wave. However, this method changes an energy relationship and phase of original seismic wavefield data while filtering out the tube wave, and there are still some strong tube waves in seismic wave records after the filtering. The other method is a frequency-wavenumber domain filtering method including: transforming original seismic wavefield data to obtain a frequency-wavenumber spectrum thereof, selecting an apparent velocity range of the tube wave, and clearing the frequency-wavenumber spectrum within the apparent velocity range. However, this method cannot filter out the tube wave corresponding to a spatial alias frequency, so it is difficult to effectively remove the tube wave interference.

As can be seen from the above analysis, the conventional methods for removing tube wave interference from optical fiber acoustic wave sensing seismic data have the technical problems that the tube wave interference cannot be completely removed and valid signals may be easily filtered out.

SUMMARY

The embodiments of the present disclosure provide a method for removing tube wave interference from optical fiber acoustic wave sensing seismic data to solve the technical problem that the conventional methods for removing tube wave interference from optical fiber acoustic wave sensing seismic data cannot completely remove the tube wave interference and may easily filter out valid signals. The method includes: acquiring seismic wavefield data which contains a tube wave and is collected by an optical fiber acoustic wave sensing instrument, in which the seismic wavefield data comprises amplitude values at each sampling time point of seismic traces excited by a single shot; downwardly cutting waveform data with a preset time window length on each seismic trace along travel time of the tube wave, and calculating a root-mean-square amplitude of the waveform data cut on the seismic trace as an amplitude normalization factor of the seismic trace; performing normalization processing on the amplitude value of each seismic trace at each sampling time point based on the amplitude normalization factor of each seismic trace, to obtain a normalized amplitude value of the seismic trace at each sampling time point; performing de-tail mean filtering processing on the normalized amplitude value of each seismic trace at each sampling time point along the travel time of the tube wave, to obtain a predicted amplitude value of the tube wave at the sampling time point; and performing tube wave interference removal processing on each seismic trace at each sampling time point based on the predicted amplitude value of the tube wave at the sampling time point, and performing inverse normalization processing on the seismic trace at the sampling time point using the amplitude normalization factor of the seismic trace, so as to obtain the seismic wavefield data without tube wave interference.

The embodiments of the present disclosure provide an apparatus for removing tube wave interference from optical fiber acoustic wave sensing seismic data to solve the technical problem that the conventional methods for removing tube wave interference from optical fiber acoustic wave sensing seismic data cannot completely remove the tube wave interference and may easily filter out valid signals. The apparatus includes: a seismic wavefield data acquisition unit configured to acquire seismic wavefield data which contains a tube wave and is collected by an optical fiber acoustic wave sensing instrument, in which the seismic wavefield data comprises amplitude values at each sampling time point of seismic traces excited by a single shot; a normalization factor determination unit configured to downwardly cut waveform data with a preset time window length on each seismic trace along travel time of a tube wave, and calculate a root-mean-square amplitude of the waveform data cut on the seismic trace as an amplitude normalization factor of the seismic trace; a normalization processing unit configured to perform normalization processing on the amplitude value of each seismic trace at each sampling time point based on the amplitude normalization factor of the seismic trace, to obtain a normalized amplitude value of the seismic trace at each sampling time point; a tube wave amplitude prediction unit configured to perform de-tail mean filtering processing on the normalized amplitude value of each seismic trace at each sampling time point along the travel time of the tube wave, to obtain a predicted amplitude value of the tube wave at the sampling time point; and a tube wave interference removal unit configured to perform tube wave interference removal processing on each seismic trace at each sampling time point based on the predicted amplitude value of the tube wave at the sampling time point, and perform inverse normalization processing on the seismic trace at the sampling time point using the amplitude normalization factor of the seismic trace to obtain the seismic wavefield data without tube wave interference.

The embodiments of the present disclosure provide a computer device to solve the technical problem that the conventional methods for removing tube wave interference from optical fiber acoustic wave sensing seismic data cannot completely remove the tube wave interference and may easily filter out valid signals. The computer device includes: a memory, a processor and a computer program stored in the memory and executable on the processor, in which the processor is configured to execute the computer program to implement the aforementioned method for removing tube wave interference from optical fiber acoustic wave sensing seismic data.

The embodiments of the present disclosure provide a computer-readable storage medium to solve the technical problem that the conventional methods for removing tube wave interference from optical fiber acoustic wave sensing seismic data cannot completely remove the tube wave interference and may easily filter out valid signals. The computer-readable storage medium stores a computer program for implementing the aforementioned method for removing tube wave interference from optical fiber acoustic wave sensing seismic data.

Based on the characteristics that the tube wave interference in the optical fiber acoustic wave sensing seismic data has a relatively stable wave velocity, and the amplitude of the tube wave inversely proportional to the degree of coupling between the optical fibers and the borehole wall of the well, the embodiments of the present disclosure acquire seismic wavefield data which contains a tube wave and is collected by an optical fiber acoustic wave sensing instrument; downwardly cut waveform data with a preset time window length on each seismic trace along travel time of the tube wave, and calculate a root-mean-square amplitude of the waveform data cut on the seismic trace as an amplitude normalization factor of each seismic trace; perform normalization processing on the amplitude value of each seismic trace at each sampling time point based on the amplitude normalization factor of the seismic trace; perform de-tail mean filtering processing on the normalized result of the amplitude value of each seismic trace at each sampling time point along the travel time of the tube wave, to obtain a predicted amplitude value of the tube wave at each sampling time point; and perform tube wave interference removal processing on each seismic trace at each sampling time point based on the predicted amplitude value of the tube wave at the sampling time point, and perform inverse normalization processing using the amplitude normalization factor of the seismic trace to obtain the seismic wavefield data without tube wave interference.

Through the embodiments of the present disclosure, it can effectively suppress the tube wave interference in the optical fiber acoustic wave sensing seismic data, improve the signal-to-noise ratio of the seismic wavefield data collected by the optical fiber acoustic wave sensing instrument, highlight the seismic signals propagating along the stratum, and improve the application effect of the optical fiber sensing technology in collecting the seismic data during the seismic exploration.

BRIEF DESCRIPTION OF THE DRAWINGS

For a clearer illustration of technical features in the embodiments of the present disclosure or in the prior art, a brief description of the drawings required for describing the embodiments or the prior art will be given below. Obviously, the drawings in the following description merely illustrate some embodiments of the present disclosure, and those of ordinary skill in the art can derive other drawings from them without any inventive efforts. In the drawings.

DETAILED DESCRIPTION

For a clearer understanding of the objectives, technical features and effects of the present disclosure, the embodiments of the present disclosure will be further described in detail as follows with reference to the drawings. Here, the illustrative embodiments of the present disclosure and the descriptions thereof are intended to explain the present disclosure, rather than limitations to the present disclosure.

In the description of this specification, words such as 'include', 'comprise', 'have' and 'contain' are all open terms, which mean including but not limited to. The description of the reference terms such as 'one embodiment', 'one specific embodiment', 'some embodiments' and 'for example' means that the specific features, structures or characteristics described in connection with the embodiment(s) or example(s) are included in at least one embodiment or example of the present disclosure. In this specification, the schematic expressions of the above terms do not necessarily refer to a same embodiment or example. In addition, the described specific features, structures or characteristics may be combined in any one or more embodiments or examples in a suitable manner. The sequence of steps involved in each embodiment is used to schematically illustrate the implementation of the present disclosure, and the sequence of steps is not limited, but can be appropriately adjusted as needed.

Figure 1:
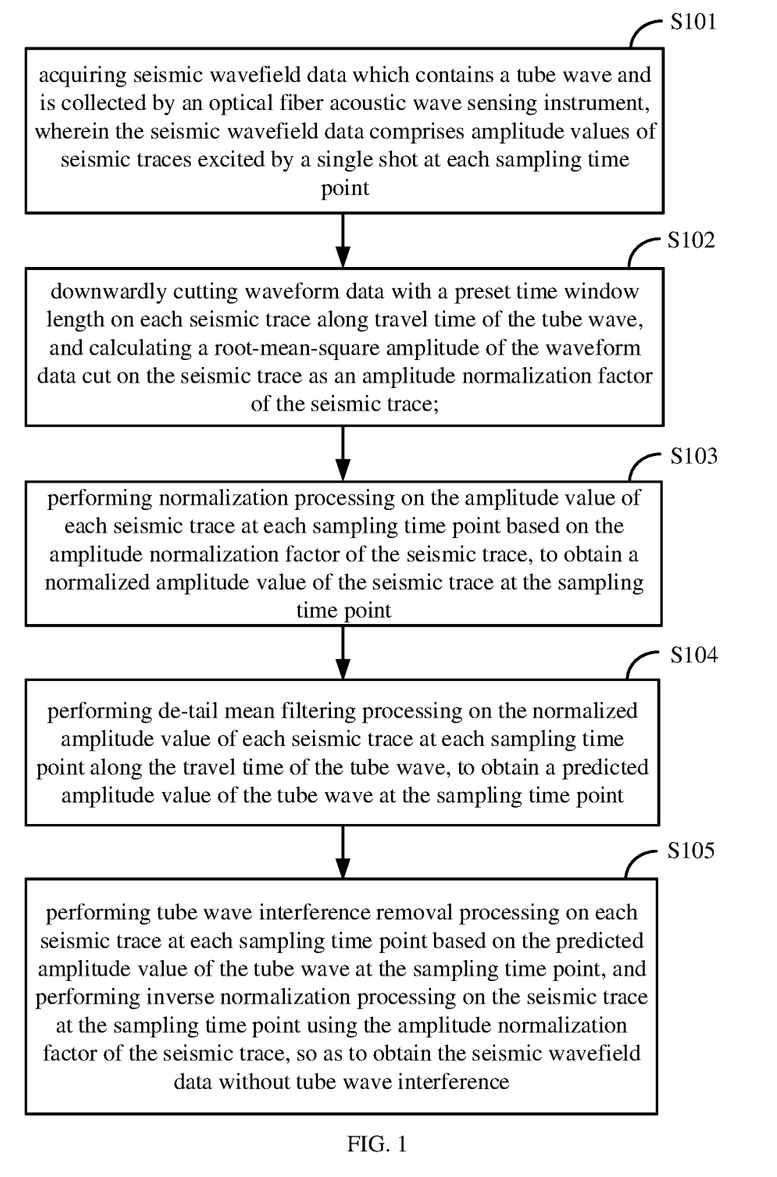
FIG. 1 is a flowchart of a method for removing tube wave interference from optical fiber acoustic wave sensing seismic data according to an embodiment of the present disclosure.

An embodiment of the present disclosure provides a method for removing tube wave interference from optical fiber acoustic wave sensing seismic data. FIG. 1 is a flowchart of a method for removing tube wave interference from optical fiber acoustic wave sensing seismic data according to an embodiment of the present disclosure. As illustrated in FIG. 1, the method includes:

S101: acquiring seismic wavefield data which contains a tube wave and is collected by an optical fiber acoustic wave sensing instrument, wherein the seismic wavefield data comprises amplitude values at each sampling time point of seismic traces excited by a single shot.

It should be noted that the optical fiber acoustic wave sensing is suitable for observing seismic waves in a well, and when being suspended in the well, optical fibers are more likely to receive tube wave interference because of an incomplete coupling between the optical fibers and the borehole wall of the well. The tube wave interference has a relatively stable wave velocity, and the amplitude value of the tube wave is inversely proportional to the coupling degree of the optical fibers (i.e., a degree of coupling between the optical fibers and the borehole wall), that is, the amplitude value of the tube wave increases as the distance between the optical fibers and the borehole wall increases (i.e., the coupling degree of the optical fibers decreases), and vice versa.

Optionally, an excitation source for exciting the seismic wavefield in the embodiment of the present disclosure may be explosives or artificial vibroseis. For example, single-shot or multi-shot seismic data is obtained by excitation of the explosives or vibroseis, and seismic wavefield data including tube wave interference is acquired by the optical fiber acoustic wave sensing instrument.

It should be noted that the seismic wavefield data collected by the optical fiber acoustic wave sensing instrument in S101 at least includes amplitude values at each sampling time point of seismic traces excited by a single shot. When the tube wave interference is removed from the multi-shot seismic wavefield data collected by the optical fiber acoustic wave sensing instrument, it is only necessary to repeatedly perform S102 to S105.

S102: downwardly cutting waveform data with a preset time window length on each seismic trace along travel time of a tube wave, and calculating a root-mean-square amplitude of the waveform data cut on the seismic trace as an amplitude normalization factor of the seismic trace.

Since the tube wave interference contained in the seismic data collected by the optical fibers has a relatively stable wave velocity, it appears as an oblique line in the single shot record of the seismic data. Thus, waveform data with a preset time window length is downwardly cut on each seismic trace along the oblique line, and a root-mean-square amplitude of the waveform data cut on the seismic trace is calculated as an amplitude normalization factor of the seismic trace. According to the embodiment of the present disclosure, a root-mean-square amplitude analysis is carried out along a time window of the tube wave, and a root-mean-square amplitude of waveform data with a preset time window length cut on each seismic trace is calculated. The root-mean-square amplitude can reflect tube wave energy and can be used as a normalized correction factor for the amplitude of each seismic trace, so as to remove the tube wave interference more effectively.

Optionally, the preset time window length adopted in the embodiment of the present disclosure may be 2 to 10 times of a dominant period of the tube wave.

It should be noted that the root-mean-square amplitude refers to a mean square value of amplitudes corresponding to sampling time points within one preset time window length, and it may be calculated using the following formula:

$$A_i = \sqrt{\frac{1}{N}\sum_{k=1}^{N} a_k^2};$$

where $A_i$ represents a root-mean-square amplitude of an i-th seismic trace within the preset time window length; N represents the number of the sampling time points within the preset time window length; and $a_k$ represents an amplitude corresponding to each sampling time point.

S103: performing normalization processing on the amplitude value of each seismic trace at each sampling time point based on the amplitude normalization factor of the seismic trace, to obtain a normalized amplitude value of the seismic trace at the sampling time point.

It should be noted that in the embodiment of the present disclosure, when the normalization processing is performed on the amplitudes of each seismic trace in S103, it may, but not limited to, divide the amplitude value of each seismic trace at each sampling time point by the amplitude normalization factor of the seismic trace, to obtain the normalized amplitude value of the seismic trace at each sampling time point.

S104: performing de-tail mean filtering processing on the normalized amplitude value of each seismic trace at each sampling time point along the travel time of the tube wave, to obtain a predicted amplitude value of the tube wave at the sampling time point.

In one embodiment, S104 may be implemented by sorting the normalized amplitude values of the seismic traces at each sampling time point along a direction of the travel time of the tube wave, removing the first n normalized amplitude values and the last n normalized amplitude values, and performing a mean value calculation on the remaining normalized amplitude values to obtain a predicted amplitude value of the tube wave at each sampling time point, where n is a positive integer.

It should be noted that, during the implementation, after the amplitude values corresponding to each sampling time point are sorted in S104, the number of the data in the front to be removed may be the same as or different from the number of the data in the rear to be removed. Generally, the value of n is less than half of a total number of the seismic traces involved in filtering. Optionally, the value range of n is from 5 to 15. For example, in a case where the number of the data to be processed by the de-tail mean filtering is 11, 3 first data or 3 last data in the sorting may be removed, i.e., n=3.

S105: performing tube wave interference removal processing on each seismic trace at each sampling time point based on the predicted amplitude value of the tube wave at the sampling time point, and performing inverse normalization processing on the seismic trace at the sampling time point using the amplitude normalization factor of the seismic trace, so as to obtain the seismic wavefield data without tube wave interference.

It should be noted that, when the normalization processing is performed in S103, it is possible to divide the amplitude value at each sampling time point of each seismic trace by the amplitude normalization factor of the seismic trace, to obtain the normalized amplitude value of the seismic trace at the sampling time point. Correspondingly, during the implementation of S105, it is possible to subtract the predicted amplitude value of the tube wave at each sampling time point from the normalized amplitude value at the sampling time point of each seismic trace to obtain a result, and multiply the result by the amplitude normalization factor of the seismic trace to obtain the seismic wavefield data without tube wave interference.

As can be seen from the above, based on the characteristics that the tube wave interference in the optical fiber acoustic wave sensing seismic data has a relatively stable wave velocity (i.e., an event is linear in terms of waveform), and the amplitude of the tube wave inversely proportional to the degree of coupling between the optical fibers and the borehole wall of the well, the method for removing tube wave interference from optical fiber acoustic wave sensing seismic data according to the embodiments of the present disclosure acquires seismic wavefield data which contains tube wave interference and is collected by an optical fiber acoustic wave sensing instrument; downwardly cut waveform data with a preset time window length on each seismic trace along travel time of a tube wave, and calculates a root-mean-square amplitude of the waveform data cut on the seismic trace as an amplitude normalization factor of the seismic trace; performs normalization processing on the amplitude value at each sampling time point of each seismic trace based on the amplitude normalization factor of the seismic trace; performs de-tail mean filtering processing on the normalized result of the amplitude value of each seismic trace at each sampling time point along the travel time of the tube wave, to obtain a predicted amplitude value of each tube wave at each sampling time point; and performs tube wave interference removal processing on each seismic trace at each sampling time point based on the predicted amplitude value of the tube wave at the sampling time point, and performs inverse normalization processing using the amplitude normalization factor of the seismic trace to obtain the seismic wavefield data without tube wave interference.

Through the method for removing tube wave interference from optical fiber acoustic wave sensing seismic data according to the embodiments of the present disclosure, it can effectively suppress the tube wave interference in the optical fiber acoustic wave sensing seismic data, improve the signal-to-noise ratio of the seismic wavefield data collected by the optical fiber acoustic wave sensing instrument, highlight the seismic signals propagating along the stratum, and improve the application effect of the optical fiber sensing technology in collecting the seismic data during the seismic exploration.

Optionally, in the solution provided by the embodiments of the present disclosure based on S101~S105, the tube wave interference may be suppressed for the seismic data collected by the optical fibers in the following steps:

1) Using an optical fiber acoustic wave sensing collection instrument, suspending optical fibers in the well for reception, exciting on the ground or in the well by an explosion source or artificial vibroseis, or adopting a passive reception during a microseismic collection, so as to collect seismic wavefield data.

2) Preprocessing the seismic wavefield data collected in step 1), picking up travel time of the tube wave along a strong tube wave event, downwardly cutting data with a time window length of Lw, and calculating root-mean-square amplitudes within the time window length, to obtain a root-mean-square amplitude $A_i$ as an amplitude normalization factor of an i-th seismic trace.

Optionally, the time window length is determined based on a dominant period D of the tube wave, and is generally 2 to 10 times of the period D. For example, Lw=100 ms.

3) Using the amplitude normalization factor of each seismic trace determined in step 2) to divide the amplitude at each sampling time point of each seismic trace in the collected seismic wavefield data by the normalization factor $A_i$ of the seismic trace, and performing de-tail mean filtering and calculating of amplitudes of each seismic trace at each sampling time point along the picked up travel time of the tube wave, to obtain the amplitude value of the tube wave interference at the sampling time point.

It should be noted that in the embodiment of the present disclosure, the de-tail mean filtering processing means using the input seismic trace to sort amplitudes of seismic traces at each sampling time point along the picked-up travel time, removing the largest n normalized amplitude values and the smallest n normalized amplitude values, and calculating a mean value of the remaining normalized amplitude values as a predicted output value of the tube wave interference at each sampling time point. Here, the value of n is generally less than half of the number of the counted traces involved in filtering, and the minimum value of n is 0, which is equivalent to mean filtering.

4) Using the amplitude value of the predicted tube wave interference at each sampling time point obtained through the de-tail mean filtering in step 3) to process all the input seismic traces in the current seismic data record by a subtraction method, and then multiplying each output seismic trace by the normalization factor $A_i$ to obtain the seismic data record without tube wave interference.

Through step 2) to step 4), the single shot seismic data record is denoised, and all the seismic records with tube wave interference are denoised by repeating step 2) to step 4).

5) Using the seismic data collected by the optical fibers with tube wave interference suppressed in 4) for subsequent processing and interpretation, so as to provide geophysical result data available for geological researches.

By using the method for removing tube wave interference from optical fiber acoustic wave sensing seismic data according to the embodiments of the present disclosure, the tube wave interference in the borehole seismic data collected by the optical fibers can be suppressed and removed to a large extent, and the data quality can be significantly improved, which provides a guarantee for subsequent seismic data processing and interpretation.

Figure 2:
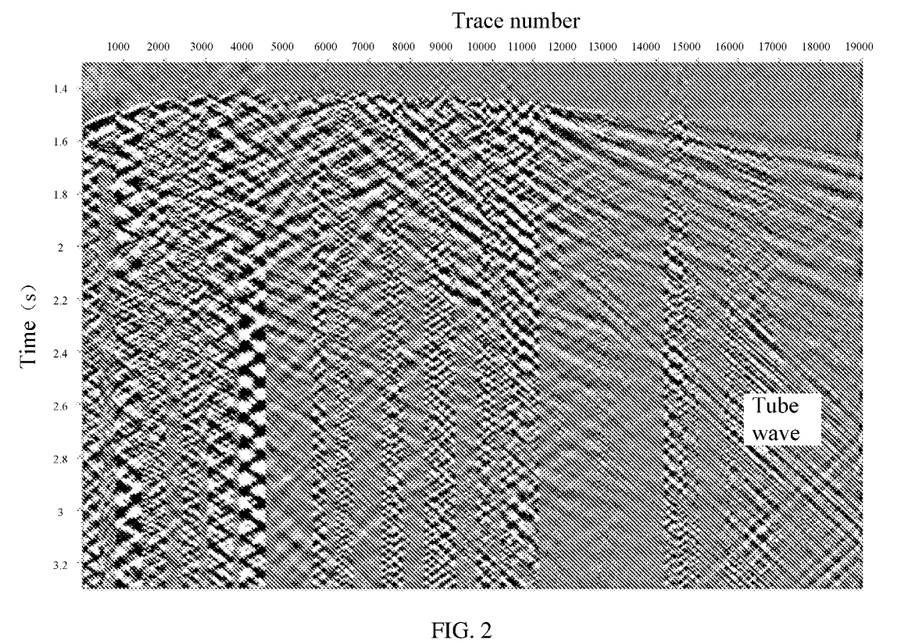
FIG. 2 is a schematic diagram of a single shot record of optical fiber acoustic wave sensing seismic data before tube wave interference is removed according to an embodiment of the present disclosure.
Figure 3:
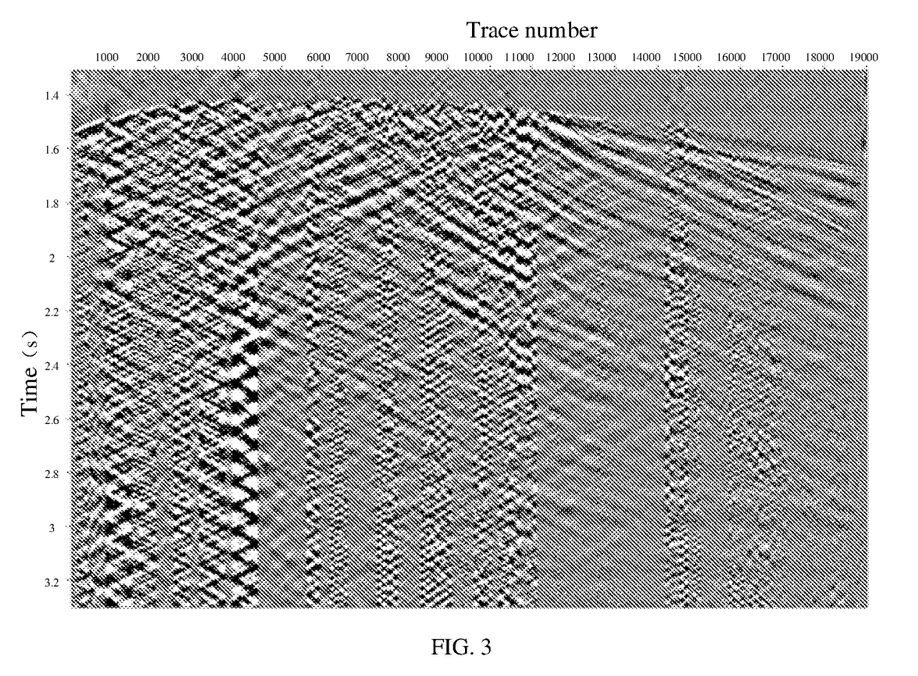
FIG. 3 is a schematic diagram of a single shot record of optical fiber acoustic wave sensing seismic data after the tube wave interference is removed according to an embodiment of the present disclosure.

Using the method for removing tube wave interference from optical fiber acoustic wave sensing seismic data according to the embodiments of the present disclosure, seismic data of an actual optical fiber collection in an oil well in North China is processed. FIG. 2 illustrates a single shot record of optical fiber acoustic wave sensing seismic data before tube wave interference is removed; and FIG. 3 illustrates a single shot record of optical fiber acoustic wave sensing seismic data after the tube wave interference is removed.

Based on the same inventive concept, an embodiment of the present disclosure further provides an apparatus for removing tube wave interference from optical fiber acoustic wave sensing seismic data, as described in the following embodiment. Since the principle of technical solution of the apparatus is similar to that of the method for removing tube wave interference from optical fiber acoustic wave sensing seismic data, the method as described above may be referred to for implementation of the apparatus, and the repetitive description is omitted herein.

Figure 4:
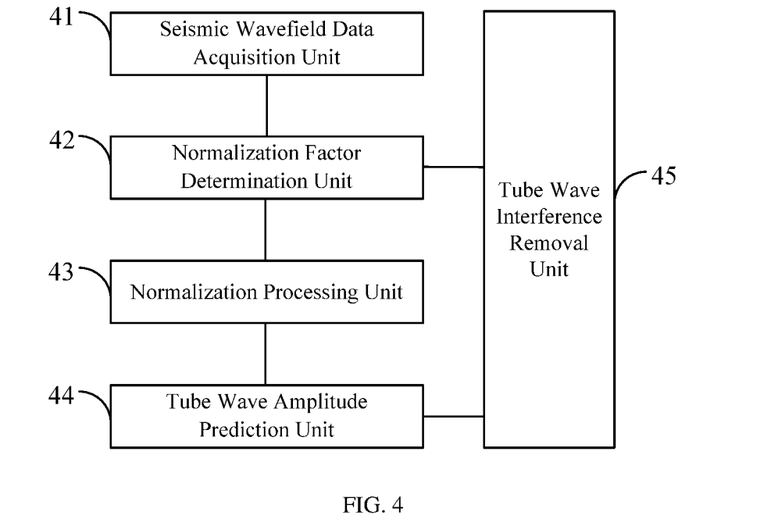
FIG. 4 is a schematic diagram of an apparatus for removing tube wave interference from optical fiber acoustic wave sensing seismic data according to an embodiment of the present disclosure.

FIG. 4 is a schematic diagram of an apparatus for removing tube wave interference from optical fiber acoustic wave sensing seismic data according to an embodiment of the present disclosure. As illustrated in FIG. 4, the apparatus may include a seismic wavefield data acquisition unit 41, a normalization factor determination unit 42, a normalization processing unit 43, a tube wave amplitude prediction unit 44 and a tube wave interference removal unit 45.

In which, the seismic wavefield data acquisition unit 41 is configured to acquire seismic wavefield data which contains a tube wave and is collected by an optical fiber acoustic wave sensing instrument, wherein the seismic wavefield data comprises amplitude values at each sampling time point of seismic traces excited by a single shot; the normalization factor determination unit 42 is configured to downwardly cut waveform data with a preset time window length on each seismic trace along travel time of a tube wave, and calculate a root-mean-square amplitude of the waveform data cut on the seismic trace as an amplitude normalization factor of the seismic trace; the normalization processing unit 43 is configured to perform normalization processing on the amplitude value at each sampling time point of each seismic trace based on the amplitude normalization factor of the seismic trace, to obtain a normalized amplitude value of the seismic trace at the sampling time point; the tube wave amplitude prediction unit 44 is configured to perform de-tail mean filtering processing on the normalized amplitude value at each sampling time point of each seismic trace along the travel time of the tube wave, to obtain a predicted amplitude value of the tube wave at the sampling time point; and the tube wave interference removal unit 45 is configured to perform tube wave interference removal processing on each seismic trace at each sampling time point based on the predicted amplitude value of the tube wave at the sampling time point, and perform inverse normalization processing on the seismic trace at the sampling time point using the amplitude normalization factor of the seismic trace, so as to obtain the seismic wavefield data without tube wave interference.

Optionally, the preset time window length is 2 to 10 times of a dominant period of the tube wave.

As can be seen from the above, in the apparatus for removing tube wave interference from optical fiber acoustic wave sensing seismic data according to the embodiments of the present disclosure, the seismic wavefield data acquisition unit 41 acquires seismic wavefield data which contains the tube wave and is collected by an optical fiber acoustic wave sensing instrument; the normalization factor determination unit 42 downwardly cut waveform data with a preset time window length on each seismic trace along travel time of a tube wave, and calculates a root-mean-square amplitude of the waveform data cut on the seismic trace as an amplitude normalization factor of the seismic trace; the normalization processing unit 43 performs normalization processing on the amplitude value at each sampling time point of each seismic trace based on the amplitude normalization factor of the seismic trace; the tube wave amplitude prediction unit 44 performs de-tail mean filtering processing on the normalized result of the amplitude value at each sampling time point of each seismic trace along the travel time of the tube wave, to obtain a predicted amplitude value at each sampling time point of tube wave; and the tube wave interference removal unit 45 performs tube wave interference removal processing on each seismic trace at each sampling time point based on the predicted amplitude value of the tube wave at the sampling time point, and performs inverse normalization processing using the amplitude normalization factor of the seismic trace to obtain the seismic wavefield data without tube wave interference.

Through the apparatus for removing tube wave interference from optical fiber acoustic wave sensing seismic data according to the embodiments of the present disclosure, it can effectively suppress the tube wave interference in the optical fiber acoustic wave sensing seismic data, improve the signal-to-noise ratio of the seismic wavefield data collected by the optical fiber acoustic wave sensing instrument, highlight the seismic signals propagating along the stratum, and improve the application effect of the optical fiber sensing technology in collecting the seismic data during the seismic exploration.

In an optional embodiment, in the apparatus for removing tube wave interference from optical fiber acoustic wave sensing seismic data according to the embodiment of the present disclosure, the tube wave amplitude prediction unit 44 is further configured to sort the normalized amplitude values of the seismic traces at each sampling time point along a direction of the travel time of the tube wave, remove the first n normalized amplitude values and the last n normalized amplitude values, and perform a mean value calculation on the remaining normalized amplitude values to obtain the predicted amplitude value of the tube wave at the sampling time point, where n is a positive integer. Optionally, a value of n is less than half of a total number of the seismic-traces involved in filtering.

In an optional embodiment, in the apparatus for removing tube wave interference from optical fiber acoustic wave sensing seismic data according to the embodiment of the present disclosure, the normalization factor determination unit 42 is further configured to divide the amplitude value at each sampling time point of each seismic trace by the amplitude normalization factor of the seismic trace, to obtain the normalized amplitude value of the seismic trace at the sampling time point; and the tube wave interference removal unit 45 is further configured to subtract the predicted amplitude value of the tube wave at each sampling time point from the normalized amplitude value at the sampling time point of each seismic trace to obtain a result, and multiply the result by the amplitude normalization factor of the seismic trace to obtain the seismic wavefield data without tube wave interference.

Figure 5:
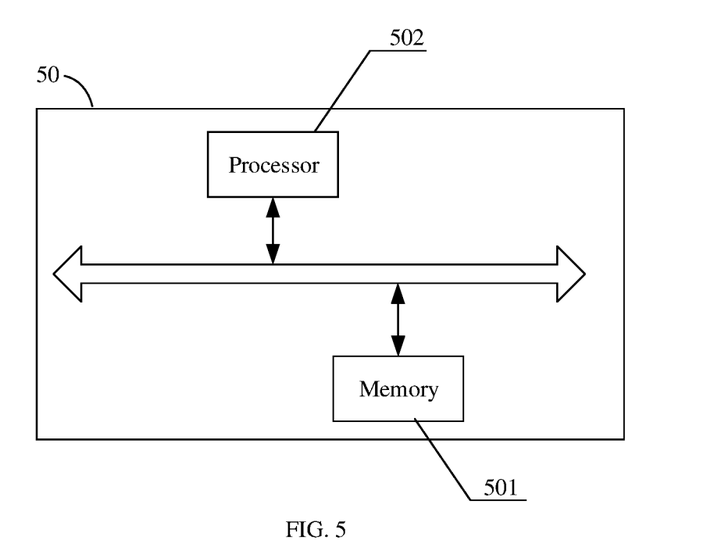
FIG. 5 is a schematic diagram of a computer device according to an embodiment of the present disclosure.

Based on the same inventive concept, an embodiment of the present disclosure further provides a computer device to solve the technical problem that the conventional methods for removing tube wave interference from optical fiber acoustic wave sensing seismic data cannot completely remove the tube wave interference and may easily filter out valid signals. FIG. 5 is a schematic diagram of a computer device according to an embodiment of the present disclosure. As illustrated in FIG. 5, the computer device 50 includes a memory 501, a processor 502, and a computer program stored in the memory 501 and executable on the processor 502. The processor 502 is configured to execute the computer program to implement any one of the embodiments of the method for removing tube wave interference from optical fiber acoustic wave sensing seismic data.

Based on the same inventive concept, an embodiment of the present disclosure further provides a computer-readable storage medium to solve the technical problem that the conventional methods for removing tube wave interference from optical fiber acoustic wave sensing seismic data cannot completely remove the tube wave interference and may easily filter out valid signals. The computer-readable storage medium stores a computer program for implementing any one of the embodiments of the method for removing tube wave interference from optical fiber acoustic wave sensing seismic data.

To sum up, the embodiments of the present disclosure provide a method and an apparatus for removing tube wave interference from optical fiber acoustic wave sensing seismic data, a computer device and a computer-readable storage medium. Optical fibers are suspended in a borehole, and explosives or vibroseis are used as excitation sources, so as to obtain seismic wavefield data collected by the optical fibers. A root-mean-square amplitude analysis is carried out on the seismic wavefield data along a time window of a tube wave, to determine and calculate tube wave energy as a tube wave normalization factor. After all seismic traces are subjected to a normalized correction, an amplitude of the tube wave at each time point is calculated by de-tail mean filtering along travel time of tube wave, and then the tube wave is removed by a subtraction method. Next, a denoised seismic wavefield is recovered using the normalization factor. Therefore, the present disclosure can greatly improve a signal-to-noise ratio of the seismic data collected by the optical fibers. According to the embodiments of the present disclosure, it is possible to improve the signal-to-noise ratio of the data collected by the optical fibers by denoising, highlight the wavefield propagating along the stratum, and improve the application effect of the optical fiber sensing technology in collecting data during the seismic exploration.

Those skilled in the art should appreciate that any embodiment of the present disclosure can be provided as a method, a system, or a computer program product. Therefore, the present disclosure can take the form of a full hardware embodiment, a full software embodiment, or an embodiment combining software and hardware. Moreover, the present invention can take the form of a computer program product implemented on one or more computer usable storage mediums (including, but not limited to, a magnetic disc memory, CD-ROM, optical storage, etc.) containing therein computer usable program codes.

The present disclosure is described with reference to a flow diagram and/or a block diagram of the method, device (system) and computer program product according to the embodiments of the present disclosure. It should be appreciated that each flow and/or block in the flow diagram and/or the block diagram and a combination of flows and/or blocks in the flow diagram and/or the block diagram can be realized by computer program instructions. Those computer program instructions can be provided to a general computer, a dedicated computer, an embedded processor or a processor of other programmable data processing device to produce a machine, so that the instructions executed by the processor of the computer or other programmable data processing device produce means for realizing specified functions in one or more flows in the flow diagram and/or one or more blocks in the block diagram.

These computer program instructions can also be stored in a computer readable memory capable of directing the computer or other programmable data processing devices to operate in a specific manner, such that the instructions stored in the computer readable memory generate a manufactured article including an instruction device that implements the function(s) designated in one flow or a plurality of flows in the flow diagram and/or a block or a plurality of blocks in the block diagram.

These computer program instructions can also be loaded onto a computer or other programmable data processing devices, such that a series of operation steps is executed on the computer or other programmable devices to generate the processing realized by the computer, therefore the instructions executed on the computer or other programmable devices provide the steps for implementing the function designated in one flow or a plurality of flows in the flow chart and/or a block or a plurality of blocks in the block diagram.

The above specific embodiments have further explained the objectives, technical solutions and advantageous effects of the present disclosure in detail. It should be appreciated that those described above are just specific embodiments of the present disclosure, and are not intended to limit the protection scope of the present disclosure. Any modification, equivalent substitution, improvement, etc. made within the spirit and principle of the present disclosure should fall within the protection scope of the present disclosure.

The invention claimed is:

1. A method for removing tube wave interference from optical fiber acoustic wave sensing seismic data, the method comprising:
    suspending optical fibers in a well, the optical fibers being connected to an optical fiber acoustic wave sensing instrument;
    exciting a seismic wavefield by an explosion source or artificial vibroseis on the ground or in the well;
    collecting, by the optical fiber acoustic wave sensing instrument, seismic wavefield data which contains a tube wave, wherein the seismic wavefield data comprises amplitude values at each sampling time point of seismic traces excited by a single shot, and the tube wave has an amplitude value that is inversely proportional to a degree of coupling between the optical fibers and a borehole wall of the well;
    acquiring, by a processor, the seismic wavefield data;
    downwardly cutting, by the processor, waveform data with a preset time window length on each seismic trace along travel time of the tube wave, and calculating, by the processor, a root-mean-square amplitude of the waveform data cut on the seismic trace as an amplitude normalization factor of the seismic trace;
    performing, by the processor, normalization processing on the amplitude value of each seismic trace at each sampling time point based on the amplitude normalization factor of the seismic trace, to obtain a normalized amplitude value of the seismic trace at the sampling time point;
    performing, by the processor, de-tail mean filtering processing on the normalized amplitude value of each seismic trace at each sampling time point along the travel time of the tube wave, to obtain a predicted amplitude value of the tube wave at the sampling time point;
    performing, by the processor, tube wave interference removal processing on each seismic trace at each sampling time point based on the predicted amplitude value of the tube wave at the sampling time point, and performing, by the processor, inverse normalization processing on the seismic trace at the sampling time point using the amplitude normalization factor of the seismic trace, so as to obtain the seismic wavefield data without tube wave interference; and
    performing seismic exploration using the seismic wavefield data without tube wave interference.

2. The method according to claim 1, wherein performing the de-tail mean filtering processing on the normalized amplitude value of each seismic trace at each sampling time point along the travel time of the tube wave, to obtain a predicted amplitude value of the tube wave at the sampling time point, comprises:
    sorting the normalized amplitude values of the seismic traces at each sampling time point along a direction of the travel time of the tube wave, removing the first n normalized amplitude values and the last n normalized amplitude values, and performing a mean value calculation on the remaining normalized amplitude values to obtain the predicted amplitude value of the tube wave at the sampling time point, where n is a positive integer.

3. The method according to claim 2, wherein a value of n is less than half of a total number of the seismic traces involved in filtering.

4. The method according to claim 1, wherein:
performing the normalization processing on the amplitude value of each seismic trace at each sampling time point based on the amplitude normalization factor of the seismic trace, to obtain the normalized amplitude value of the seismic trace at the sampling time point, comprises: dividing the amplitude value of each seismic trace at each sampling time point by the amplitude normalization factor of the seismic trace, to obtain the normalized amplitude value at the sampling time point of the seismic trace; and
performing the tube wave interference removal processing on each seismic trace at each sampling time point based on the predicted amplitude value of the tube wave at the sampling time point, and performing the inverse normalization processing on the seismic trace at the sampling time point using the amplitude normalization factor of the seismic trace to obtain the seismic wavefield data without the tube wave interference, comprises: subtracting the predicted amplitude value of the tube wave at each sampling time point from the normalized amplitude value of each seismic trace at the sampling time point to obtain a result, and multiplying the result by the amplitude normalization factor of the seismic trace to obtain the seismic wavefield data without the tube wave interference.

5. The method according to claim 1, wherein the preset time window length is 2 to 10 times of a dominant period of the tube wave.

6. An apparatus comprising:
optical fibers for being suspended in a well;
an optical fiber acoustic wave sensing instrument connected to the optical fibers and configured to collect seismic wavefield data which contains a tube wave, wherein the seismic wavefield data comprises amplitude values at each sampling time point of seismic traces excited by a single shot, the tube wave has an amplitude value that is inversely proportional to a degree of coupling between the optical fibers and a borehole wall of the well, and the seismic wavefield is excited by an explosion source or artificial vibroseis on the ground or in the well;
a seismic wavefield data acquisition unit configured to acquire the seismic wavefield data;
a normalization factor determination unit configured to downwardly cut waveform data with a preset time window length on each seismic trace along travel time of the tube wave, and calculate a root-mean-square amplitude of the waveform data cut on the seismic trace as an amplitude normalization factor of the seismic trace;
a normalization processing unit configured to perform normalization processing on the amplitude value of each seismic trace at each sampling time point based on the amplitude normalization factor of the seismic trace, to obtain a normalized amplitude value of the seismic trace at the sampling time point;
a tube wave amplitude prediction unit configured to perform de-tail mean filtering processing on the normalized amplitude value of each seismic trace at each sampling time point along the travel time of the tube wave, to obtain a predicted amplitude value of the tube wave at the sampling time point; and
a tube wave interference removal unit configured to perform tube wave interference removal processing on each seismic trace at each sampling time point based on the predicted amplitude value of the tube wave at the sampling time point, and perform inverse normalization processing on the seismic trace at the sampling time point using the amplitude normalization factor of the seismic trace to obtain the seismic wavefield data without tube wave interference for seismic exploration.

7. The apparatus according to claim 6, wherein the tube wave amplitude prediction unit is further configured to sort the normalized amplitude values of the seismic traces at each sampling time point along a direction of the travel time of the tube wave, remove the first n normalized amplitude values and the last n normalized amplitude values, and perform a mean value calculation on the remaining normalized amplitude values to obtain a predicted amplitude value of the tube wave at the sampling time point, where n is a positive integer.

8. The apparatus according to claim 6, wherein the normalization factor determination unit is further configured to divide the amplitude value of each seismic trace at each sampling time point by the amplitude normalization factor of the seismic trace, to obtain the normalized amplitude value of the seismic trace at the sampling time point; and the tube wave interference removal unit is further configured to subtract the predicted amplitude value of the tube wave at each sampling time point from the normalized amplitude value of each seismic trace at the sampling time point to obtain a result, and multiply the result by the amplitude normalization factor of the seismic trace to obtain the seismic wavefield data without tube wave interference.

9. A computer device, comprising a memory, a processor and a computer program stored in the memory and executable on the processor, wherein the processor is configured to execute the computer program to implement a method for removing tube wave interference from optical fiber acoustic wave sensing seismic data, the method comprising:
acquiring seismic wavefield data which contains a tube wave and is collected by an optical fiber acoustic wave sensing instrument, wherein the optical fiber acoustic wave sensing instrument is connected to optical fibers that are suspended in a well, the seismic wavefield data comprises amplitude values at each sampling time point of seismic traces excited by a single shot, the tube wave has an amplitude value that is inversely proportional to a degree of coupling between the optical fibers and a borehole wall of the well, and the seismic wavefield is excited by an explosion source or artificial vibroseis on the ground or in the well;
downwardly cutting waveform data with a preset time window length on each seismic trace along travel time of the tube wave, and calculating a root-mean-square amplitude of the waveform data cut on the seismic trace as an amplitude normalization factor of the seismic trace;
performing normalization processing on the amplitude value of each seismic trace at each sampling time point based on the amplitude normalization factor of the seismic trace, to obtain a normalized amplitude value of the seismic trace at the sampling time point;
performing de-tail mean filtering processing on the normalized amplitude value of each seismic trace at each sampling time point along the travel time of the tube wave, to obtain a predicted amplitude value of the tube wave at the sampling time point; and performing tube wave interference removal processing on each seismic trace at each sampling time point based on the predicted amplitude value of the tube wave at the sampling time point, and performing inverse normalization processing on the seismic trace at the sampling time point using the amplitude normalization factor of the seismic trace, so as to obtain the seismic wavefield data without tube wave interference for seismic exploration.

* * * * *